United States Patent

Burke et al.

[11] 3,750,704
[45] Aug. 7, 1973

[54] MULTI-WAY VALVE
[75] Inventors: George K. Burke; Kenneth Raines, both of Bethlehem, Pa.
[73] Assignee: Burron Medical Products, Inc., Bethlehem, Pa.
[22] Filed: Oct. 8, 1971
[21] Appl. No.: 187,699

[52] U.S. Cl. .......................................... 137/625.47
[51] Int. Cl. ............................................. F16k 11/00
[58] Field of Search ............... 137/625.48, 625.47, 137/609; 251/310, 311, 315

[56] References Cited
UNITED STATES PATENTS

| 3,678,960 | 7/1972 | Leibinsohn | 137/625.47 |
| 3,475,002 | 10/1969 | Phillips | 251/311 X |
| 3,618,637 | 11/1971 | Santomieri | 137/625.47 X |
| 3,481,367 | 12/1969 | Deuschle | 137/625.47 |
| 2,854,027 | 9/1958 | Kaiser et al. | 137/625.47 X |
| 3,181,555 | 5/1965 | Jacobson | 251/351 X |
| 3,185,179 | 5/1965 | Harautuneian | 137/625.47 |
| 3,325,143 | 6/1967 | Phillips | 251/311 |
| 3,598,150 | 8/1971 | Nolan | 251/352 X |

Primary Examiner—Samuel Scott
Attorney—Shoemaker & Mattare

[57] ABSTRACT

A multi-way valve comprising, a cylindrical valve body made of plastic and having a plurality of ports in the side wall thereof, a cylindrical valve plug made of rubber and rotatably fitted within said valve body, said valve plug having passage means therein adapted to be brought into registry with the ports in the valve body to control flow therethrough, and handle means connected with the valve plug for rotating the valve plug.

12 Claims, 11 Drawing Figures

PATENTED AUG 7 1973 3,750,704
SHEET 1 OF 2
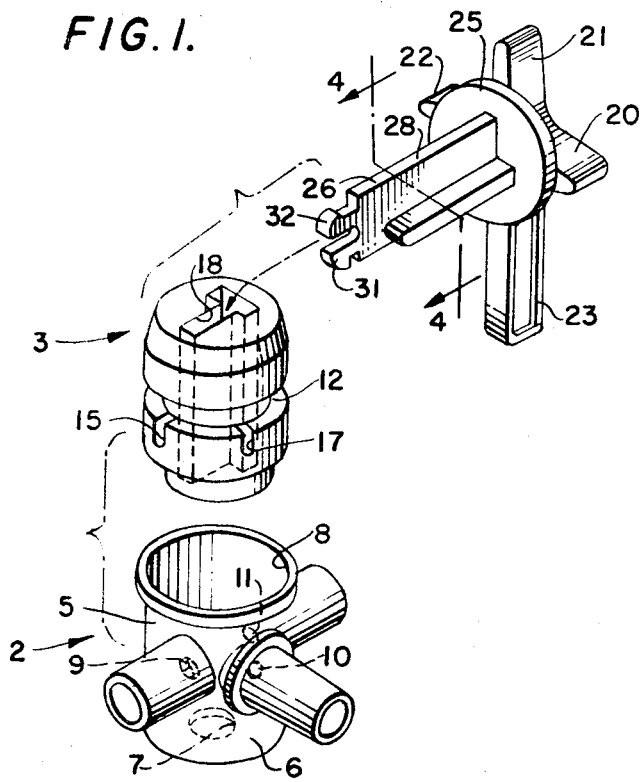
FIG. 1.
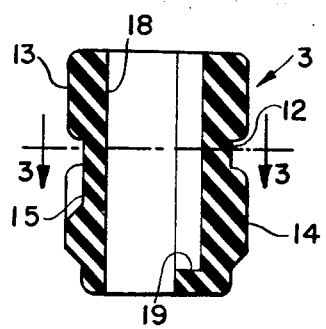
FIG. 2.
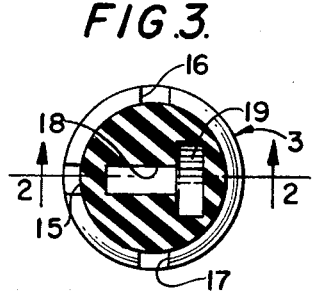
FIG. 3.
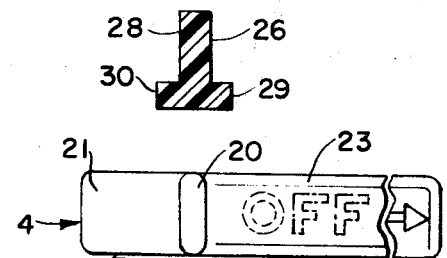
FIG. 4.
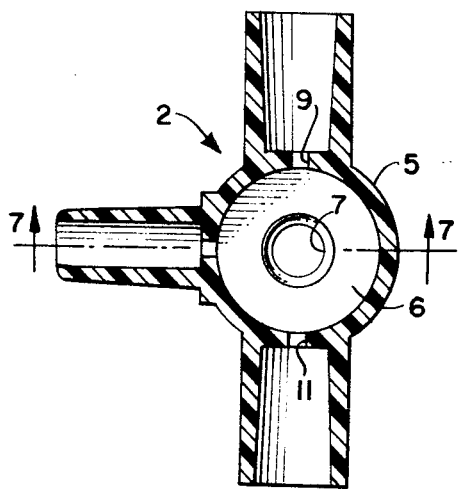
FIG. 5.
FIG. 6.
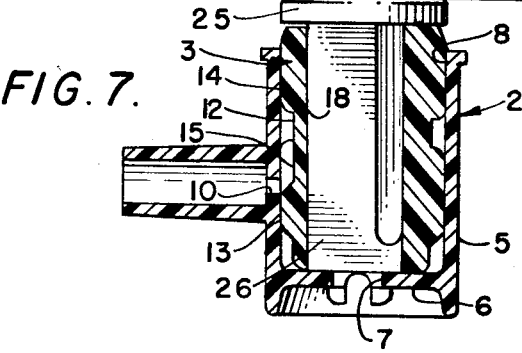
FIG. 7.
INVENTORS
GEORGE K. BURKE &
KENNETH RAINES
BY Shoemaker and Mattare
ATTORNEYS

PATENTED AUG 7 1973

INVENTORS
GEORGE K. BURKE &
KENNETH RAINES

BY *Shoemaker and Mattare*

ATTORNEYS

MULTI-WAY VALVE

BACKGROUND OF THE INVENTION

This invention relates to multi-way valves and more particularly to such a valve adapted for use in surgery or for administering medicaments or blood or the like to a patient.

Multi-way valves for controlling the administration of medicaments or the like to patients are known in the art, but such valves are either relatively expensive and must be sterilized after each use thereof, or they are inexpensively made so as to be disposable after a single use, but as a consequence they generally do not perform satisfactorily. For example, many such prior art valves comprise a valve body and a valve plug both of which are made of a plastic material. Valves in which the valve body and valve plug are both made of plastic have several serious disadvantages.

First, due to the nature of the plastic materials, the amount of pressure which can be withstood by the valve is limited. Further, depending upon the type of plastic material used, the valve is brittle and is easily broken if dropped or struck. Moreover, when compatible plastic materials are used in the valve body and the valve plug, the plastic tends to creep and distroy or lessen the effectiveness of the seal between the valve plug and valve body. Additionally, when the materials are compatible, the valve components tend to experience a compression set, rendering them inoperable, and the high frictional drag between the valve plug and valve body makes the valve difficult to use.

The present invention provides an inexpensive and durable multi-way valve wherein the valve body is preferably made of a plastic material such as polypropylene or the like and the valve plug is made of a medical grade rubber. A better seal is effected between the rubber valve plug and plastic valve body in the present invention then can be accomplished in prior art valves wherein all of the components of the valve are made of plastic. Further, the present valve is capable of withstanding more internal pressure than an all plastic unit, and it is resistant to compression set. Also, the present valve is smoother in operation and is easier to use than all-plastic units.

Further, the valve body and valve plug of the present invention are easy to mold with multiple flow passages therein for accurately controlling flow through a plurality of ports in the valve body. The valve plug is held assembled with the valve body in a simple and effective manner by means of a snap lock operatively connected with the valve plug and valve body.

Due to its simplicity and economical construction, the valve of the present invention can be used only once and then thrown away, if desired, at less cost to the user than if a more expensive valve was used and then sterilized for reuse.

OBJECTS OF THE INVENTION

It is an object of this invention to provide a multi-way valve wherein the valve body and valve plug are made of diverse inexpensive materials which effect a fluid tight seal therebetween and which can withstand greater internal pressure than prior art valves.

Another object of this invention is to provide a multi-way valve which is made of a material resistant to compression set and is smoother and easier to operate than prior art units.

A further object of this invention is to provide a multi-way valve comprising a valve body and a valve plug rotatably fitted therewithin with a plurality of ports in the valve body and a plurality of flow passages in the valve plug adapted to be brought into registry with the valve ports for controlling flow through the valve, said valve plug being assembled to the valve body by a simple snap fit locking means.

A still further object of the present invention is to provide a multi-way valve unit comprising a valve body, a valve plug and a handle unit, said handle unit including an actuating shaft received through an axial bore in said valve plug and extending through said valve plug into interlocking engagement with the valve body to lock the valve body, valve plug and handle means together for relative rotation between the valve plug and valve body upon actuation of the handle.

A still further object of this invention is to provide a multi-way valve comprising a valve body having a plurality of circumferentially spaced ports therein, a valve plug rotatably fitted within the valve body and having a plurality of flow passage means therein adapted to register with the ports in the valve body for controlling flow therethrough, wherein said valve plug has substantially cylindrical sealing surfaces thereon engaged with the inner surface of the valve body to effect a fluid tight seal therebetween without the use of separate sealing means.

BRIEF DESCRIPTION OF THE DRAWINGS

FIG. 1 is an exploded perspective view of a first form of valve according to the present invention.

FIG. 2 is a vertical sectional view of the valve plug of FIG. 1.

FIG. 3 is a horizontal sectional view of the valve plug of FIG. 1 and is taken along line 3—3 in FIG. 2.

FIG. 4 is a sectional view of the shaft of the handle means of FIG. 1 and is taken along line 4—4 in FIG. 1.

FIG. 5 is a top plan view of the handle means of the present invention.

FIG. 6 is a horizontal sectional view of the valve body of FIG. 1.

FIG. 7 is a vertical sectional view of the valve body of FIG. 1 and is taken along line 7—7 in FIG. 6.

DETAILED DESCRIPTION OF THE INVENTION

Figure 8:
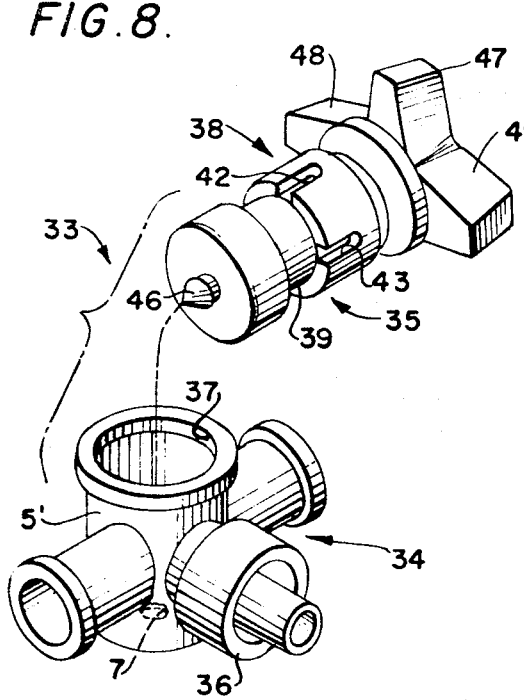
FIG. 8 is an exploded perspective view of a second form of valve according to the present invention.

Referring now to the drawings, wherein like reference numerals refer to like parts throughout the several views, a first form of multi-way valve is indicated generally at 1 in FIG. 1 and comprises a valve body 2, a valve plug 3 and a handle and stem unit 4.

The valve body 2 is preferably made of a white polypropylene material or the like and includes a cylindrical side wall 5 having an end wall 6 closing one end thereof and an aperture 7 therethrough. The other end 8 of the valve body is open. A plurality of ports 9, 10 and 11 spaced 90 degrees apart about the circumference of the side wall 5 are formed through the side wall intermediate the ends thereof and lie in substantially the same plane.

The valve plug 3 is generally cylindrical in configuration and the outer diameter thereof is substantially the same as or slightly greater than the inner diameter of the side wall 5 of valve body 2. An annular channel 12 is formed in the valve plug 3 intermediate the ends thereof and substantially mid-way of the length of the valve plug. The channel 12 divides the valve plug 3 into an upper cylindrical surface 13 and a lower cylindrical surface 14. The surfaces 13 and 14 engage the inner surface of side wall 5 of the valve body to effect a fluid tight seal therebetween. A plurality of circumferentially spaced axial grooves 15, 16 and 17 are formed in the lower cylindrical surface 14 and extend from the annular channel 12 to approximately the mid-portion of the cylindrical surface 14.

As seen best in FIG. 7, the annular channel 12 is spaced vertically above the ports 9, 10 and 11 in the valve body when the valve plug is assembled thereto and the axial grooves 15, 16 and 17 extend from the channel to the ports to define a flow path from one port through an associated groove and through the channel to another groove and its associated port.

An axial bore 18 having a generally T-shaped cross sectional configuration is formed through the valve plug 3 with the cross portion of the T terminating short of the lower end of the valve plug 3 to define a shoulder 19 against which a corresponding structure on the handle means 4 engages.

The handle 4 comprises three radially directed equally spaced indicating and handle portions 20, 21 and 22 adapted to be aligned with respective ones of the ports 9, 10 and 11 to indicate when a groove 15, 16 or 17 is aligned with that port to enable flow therethrough. An elongate indicating handle portion 23 extends diametrically opposite from indicating handle portion 21, and when the handle portion 23 is aligned with one of the ports 9, 10 or 11, that port is covered by the cylindrical portion 14 of the valve plug and accordingly, no flow occurs therethrough.

A generally disc shaped spacer 25 is on the underside of the indicating handle means and a valve stem or actuator 26 projects axially downwardly therefrom. The stem 26 is substantially T-shaped in cross sectional configuration and is approximately of the same size as the bore 18 in the valve plug 3. The stem comprises a substantially flat rectangular member 28 with a pair of oppositely directed laterally extending flanges 29 and 30 extending along one edge thereof and terminating short of the free end of the stem 26. The flanges 29 and 30 are adapted to engage shoulder 19 in the bore 18 to securely clamp the valve plug 3 between the disc 25 of handle 4 and the bottom wall 6 of the valve body 2. The free end of the valve stem 26 is bifurcated and includes a pair of generally parallel yieldable detents 31 and 32 which are adapted to be received through the aperture 7 in wall 6 in snap locking interengagement therewith as seen in FIG. 7 to lock the valve body, valve plug and handle together.

Referring now to FIGS. 8, 9, 10 and 11, a second form of the invention is illustrated.

In FIG. 8, the modified valve is indicated generally at 33 and comprises a valve body 34 preferably made of a polypropylene material or the like and a valve plug and handle unit 35 preferably made of a medical grade rubber or the like. The valve body 34 is substantially the same as the valve body 2 previously described except that a Luer lock adapter 36 is ultrasonically sealed in surrounding relationship to a female adapter on one side of the valve body in association with one of the ports 10. Additionally, the open upper end of the valve body 34 has a radially inwardly directed annular flange 37 thereon.

Figure 9:
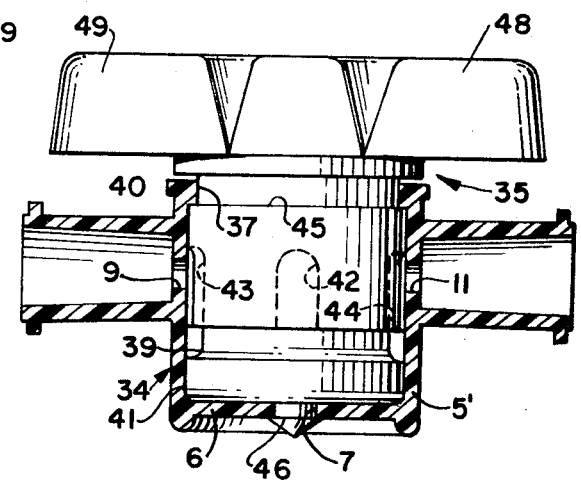
FIG. 9 is a vertical sectional view of the valve of FIG. 8 and is taken along line 9—9 pf FIG. 10.
Figure 10:
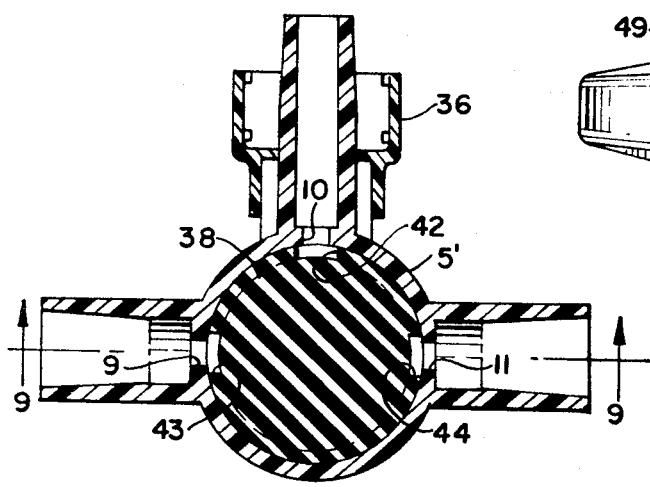
FIG. 10 is a horizontal sectional view of the valve shown in FIG. 8.
Figure 11:
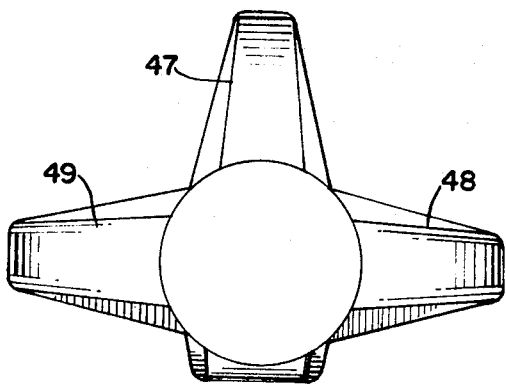
FIG. 11 is a plan view of the handle means of the valve shown in FIG. 8.

The valve plug and handle assembly 35 has a substantially cylindrical valve plug portion 38 with an annular channel 39 therein intermediate the ends thereof and spaced vertically downwardly from the plane of the ports 9, 10 and 11 in the valve body 34. The channel 39 divides the valve plug 38 into an upper cylindrical sealing surface 40 and a lower cylindrical sealing surface 41 which are of slightly greater or substantially the same diameter as the inner diameter of the side wall 5' of valve body 34 to effect a fluid tight seal therewith. A plurality of axial grooves 42, 43 and 44 extend from the channel 39 upwardly along cylindrical portion 40 to the ports 9, 10 and 11 to establish a flow path from one port 9 through an associated groove 43 and through channel 39 and another groove 44 to its associated port 11 in one position of the valve, or as shown in FIGS. 9 and 10, all of the ports are aligned with a groove and consequently with the channel 39 and thus with one another.

An annular groove or notch 45 is formed in the valve plug portion 38 adjacent the upper end of upper cylindrical portion 40, and the radially inwardly directed flange 37 of valve body 34 is received therein to lock the valve plug and valve body together.

An axially extending snap locking means 46 is formed substantially in the center of the lower end of the valve plug and handle assembly 35 and is snapped through the aperture 7 in bottom wall 6 to aid in maintaining the valve plug and valve body in assembled relationship.

Radially extending indicating handle portions 47, 48 and 49 are integrally formed with the valve plug portion 38 and are adapted to be aligned with a respective port 9, 10 or 11 to indicate when flow is occurring through that port as in the previously described embodiment.

In both of the embodiments described above, all of the valve ports may be closed by turning the indicating handle portions to a position intermediate adjacent ports in the valve body. Also, in both of the above described embodiments, the valve components are held in assembled relationship by simple snap fit and the valve plug and valve body are sealed relative to one another without the use of separate seal means, and accurate, well defined and easily controlled flow passage means are provided in the valve plug for accurately controlling flow through the valve ports of the valve body. Moreover, the use of dissimilar plastic and rubber materials in the valve body and valve plug, respectively, enables more internal pressure to be withstood than with prior art valves and the valve is resistant to compression set.

Each of the above described valves has five positions and each of the positions is indicated by the handle means of the valve. In one position of the valve, wherein the indicating handle portions are aligned with a respective one of each of the ports 9, 10 and 11, all of the ports are open; and in another position, wherein the indicating handle portions are not aligned with any port, all of the ports are closed. By aligning the indicating handle portions with selected ports, any combination of the three ports can be opened and the remaining ports or port closed. For example, in one position the left and upper port as viewed in FIG. 6 would be opened; in another position the left and bottom ports would be open for flow therebetween; and in another position, the upper and bottom ports would be open for flow therebetween.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

What is claimed is:

1. A multi-way valve comprising a tubular valve body having a side wall, an end wall closing one end of the tubular valve body and having a central aperture therethrough, the other end of the valve body being open, a plurality of circumferentially spaced ports opening through the side wall of the valve body between the ends thereof, a valve plug rotatably fitted within the valve body and having an outer surface sealingly engaged with an inner surface of the valve body, a plurality of flow passageways in said valve plug selectively registerable with the ports in said valve body upon rotation of said valve plug to establish and interrupt flow between the ports, an axial bore through the valve plug, handle means separate from said valve plug and having an axial stem received in the axial bore in the valve plug with one end of the stem projecting beyond said other end of said valve plug and through said aperture in said end wall, and snap locking means on said one end of the stem snapped through said aperture to lock said stem and valve plug in the valve body.

2. A multi-way valve as in claim 1, wherein said valve body comprises a plastic material and said valve plug comprises a rubber material.

3. A multi-way valve as in claim 2, wherein said plastic material is polypropylene and said rubber material is medical grade rubber.

4. A multi-way valve as in claim 3, wherein said end wall is integral with said valve body.

5. A multi-way valve as in claim 4, wherein there are three ports in said valve body spaced 90° apart about the circumference thereof and there are three grooves in said valve plug spaced 90° apart about the circumference thereof and adapted to be brought into registry with the ports in said valve body.

6. A multi-way valve as in claim 5, wherein said handle means includes indicating means adapted to be aligned with said ports in said valve body to indicate which ports are open and which are closed.

7. A multi-way valve as in claim 6, wherein said valve plug has a cylindrical outer surface having a slightly greater diameter than the inner diameter of said valve body and engaged with the inner surface of the cylindrical wall of the valve body so that the plug is sealed with respect to the body except at said channel and said grooves so that flow is confined to said grooves and said channel.

8. A multi-way valve as in claim 1, wherein said bore has a polygonal cross section and said stem has a corresponding polygonal cross section to key said valve plug to said stem for rotation therewith.

9. A multi-way valve as in claim 8, wherein said bore and said stem are generally T-shaped in cross section.

10. A multi-way valve comprising a synthetic plastic valve body with a cylindrical side wall, a closed end and a open end, a central aperture through the closed end and of substantially less diameter than the closed end, an annular, radially in turned flange on the open end, three equally spaced apart tubular fittings integral with said cylindrical side wall intermediate the ends thereof and in the same plane, a plurality of ports through the side wall, each in communication with a respective fitting, and a solid, cylindrical, rubber valve plug rotatably positoned in the valve body and sealingly engaged at its outer surface with the cylindrical side wall, one end of said plug engaged against the closed end of the valve body, an axially projecting snap-locking extension integral with said one end of said valve plug and snap-locked through said central aperture, an annular groove in the outer surface of the plug at the other end thereof, said flange on said valve body received in said annular groove, an annular flow channel in the outer surface of said valve plug intermediate the ends thereof and spaced axially from the plane of the ports in the cylindrical side wall, the outer surface of said valve plug having a plurality of axially extending flow channels extending from said annular flow channel toward said ports and terminating in the plane of the ports, said plug rotatable to bring said axially extending flow channels into registry with said ports, and a handle means integral with said other end of said valve plug.

11. A multi-way valve as in claim 10, wherein said handle means includes indicating means alignable with the ports in the valve body to indicate which ports are connected in fluid flow communicating relationship.

12. A multi-way valve as in claim 11, wherein said valve plug is constructed of medical grade rubber and said valve body is constructed of polypropylene plastic material.

* * * * *